C. CORNWALL.
Machines for Making Confectionery Lozenges.

No. 148,671.  Patented March 17, 1874.

Witnesses.
John Becker
Fred. Haynes

Charles Cornwall
by his Attorneys
Brown & Allen

UNITED STATES PATENT OFFICE.

CHARLES CORNWALL, OF BROOKLYN, NEW YORK.

IMPROVEMENT IN MACHINES FOR MAKING CONFECTIONERY LOZENGES.

Specification forming part of Letters Patent No. 148,671, dated March 17, 1874; application filed February 18, 1874.

*To all whom it may concern:*

Figure 1:
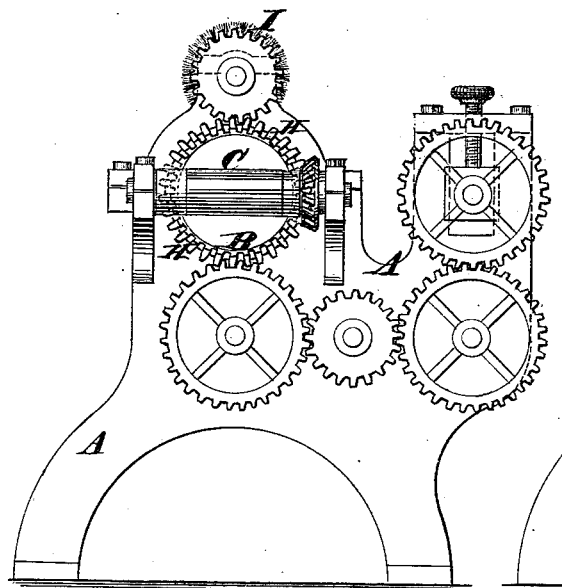
Figure 2:
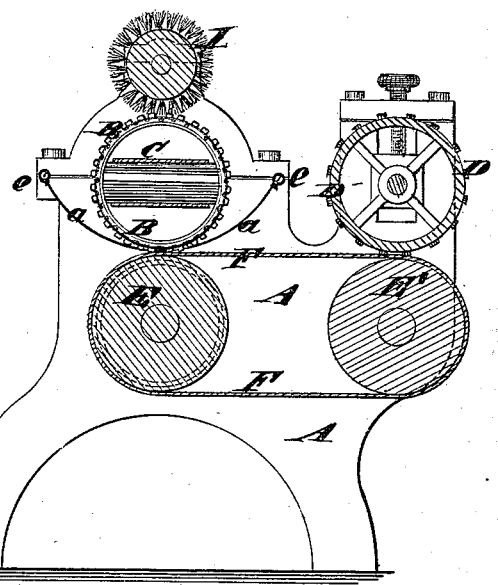
Figure 3:
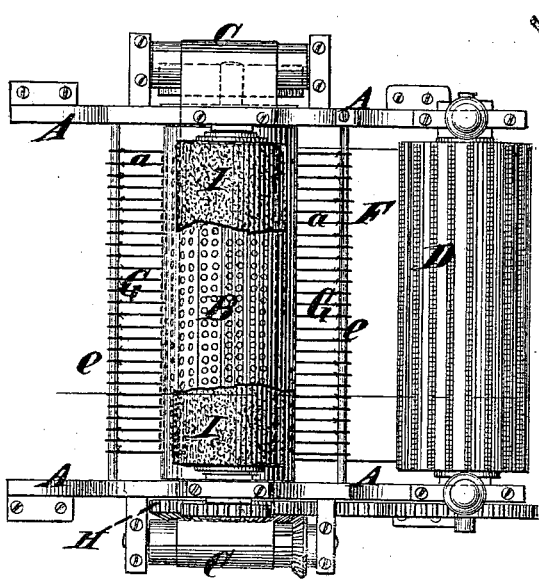
Figure 4:
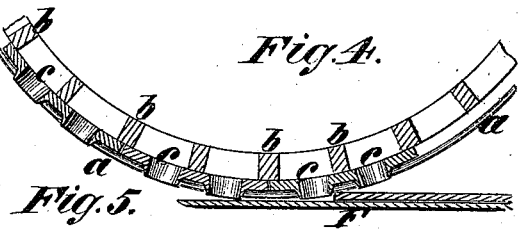
Figure 5:
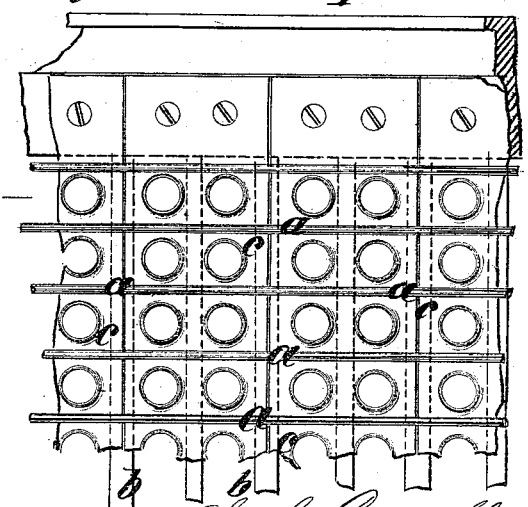

Be it known that I, CHARLES CORNWALL, of the city of Brooklyn, in the county of Kings and State of New York, have invented an Improvement in Machines for Making Confectionery Lozenges, of which the following is a specification:

In the accompanying drawing, Figure 1 represents a side elevation of the machine; Fig. 2, a vertical section on the line $x$ $x$ in Fig. 3; Fig. 3, a plan view thereof, with the central portion of the revolving brush removed. Fig. 4 is an enlarged detail view of a part of the cutting-cylinder, stripper, and apron in section; Fig. 5, an enlarged plan view, showing portions of the cutting-cylinder with cutters and stripper.

Similar letters of reference indicate corresponding parts in the different views.

The invention has for its object the rapid and cheap manufacture of lozenges of any shape, on which are printed mottoes, brief sentences, or bon mots.

The invention consists in a series of rollers and cylinders, supported by suitable framework A, and geared in such a manner as to continually and speedily feed the dough, by an apron, F, from the printing to the cutting cylinder, where it is cut, and the shaped lozenges carried up in the cutters, dropping out of them during the upper portion of their travel onto an endless belt, C, apron, or inclined plane, arranged inside the open-ended hollow cutting-cylinder B, and by which they are discharged.

The dough is fed to the printing-cylinder D in form of a sheet, having been reduced to a suitable thickness by a train of rollers, and carried from the printing to the cutting cylinder on an apron, F, traveling at the same speed as the surfaces of the mentioned cylinders, so as to bring the imprinted parts of the dough exactly under the opening of the cutters during the lowermost portion of their travel. The same number of imprints and cutters are provided in a row; therefore the feed-apron rollers E E', the printing and cutting cylinders D and B, must be geared in such a manner as to obtain the desired result.

In order to prevent the remnant or scrap of the dough, after the lozenges are cut, from adhering to the cutting-cylinder, a stripper, G, is provided, which is composed of a series of wires, $a$ $a$ $a$, running from each side of the cutting-cylinder at the height of its axis, and in a suitable distance from the cutters, down under the cutter-blades of the cutting-cylinder and between the cutters, shown in Figs. 4 and 5. By arranging the stripper in this manner, the dough must pass under the stripper, and is consequently prevented from adhering to the cutter-blades. The ends of the wires are secured to cross-bars $e$ $e$, fastened to the frame of the machine. The hollow and open-ended cutting-cylinder B is revolved in its large bearing by means of a gear-wheel, H, which is fastened to one of its ends, and composed of a cylindrical and beveled wheel. The cylindrical part is geared to the apron, carrying roller E below the cutting-cylinder, while the beveled part is geared to one of the rollers of the delivery-apron, which is arranged horizontally, and inside the cutting-cylinder, and extends beyond the frame of the machine, where the rollers rest in bearing provided for them. Above the cutting-cylinder, and geared to the aforementioned cylindrical and bevel wheel, is a revolving brush, I, which cleans the cutters of the remaining particles of the dough if they were not removed by the stripper. The cutting-cylinder is made up of a series of longitudinally-arranged bars or slats, $b$ $b$ $b$, which serve to support the cutter-bars where they meet, while the space for the discharge of the lozenges is left open. The cutter-bars $c$ $c$ $c$ are placed on the open cylinder, and suitably secured to the rim by screws or other means.

The cutter-bars may be cast with the cutters, or different-shaped cutters secured to them.

The printing-cylinder, typed in any practicable way, is made adjustable up and down by sliding bearings, which are regulated by adjusting-screws extending above the frame of the machine.

What I claim as new, and desire to secure by Letters Patent, is—

1. The combination of the open cutting-cylinder B with the internal discharging device C, substantially as described.

2. The combination of the open cutting-cylinder B, printing-cylinder D, feeding-apron F, and strippers G, all arranged and operating, in respect to each other, substantially as described, for the purpose set forth.

CHARLES CORNWALL.

Witnesses:
MICHAEL RYAN,
FRED. HAYNES.